(12) United States Patent
Macor

(10) Patent No.: US 7,233,789 B2
(45) Date of Patent: Jun. 19, 2007

(54) WIRELESS SECURITY AND ACCESS DEVICE

(75) Inventor: James Macor, Jackson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 648 days.

(21) Appl. No.: 10/002,819

(22) Filed: Nov. 15, 2001

(65) Prior Publication Data

US 2003/0092426 A1    May 15, 2003

(51) Int. Cl.
 *H04M 3/42* (2006.01)
(52) U.S. Cl. .............................. 455/414.2; 379/88.17; 380/270; 713/190; 709/206
(58) Field of Classification Search ............ 455/412.1, 455/413, 462, 566, 420, 414.2; 340/7.29; 379/88.13, 88.17; 380/270; 709/206; 713/190
See application file for complete search history.

(56) References Cited

U.S. PATENT DOCUMENTS

| | | | |
|---|---|---|---|
| 5,930,719 A * | 7/1999 | Babitch et al. ............. 455/462 |
| 6,014,559 A * | 1/2000 | Amin ......................... 455/413 |
| 6,215,992 B1 * | 4/2001 | Howell et al. ............ 455/412.1 |
| 6,230,003 B1 | 5/2001 | Macor ......................... 455/412 |
| 6,249,808 B1 * | 6/2001 | Seshadri ..................... 709/206 |
| 6,408,191 B1 * | 6/2002 | Blanchard et al. .......... 455/566 |
| 6,535,586 B1 * | 3/2003 | Cloutier et al. .......... 379/88.13 |
| 6,630,883 B1 * | 10/2003 | Amin et al. ................ 340/7.29 |
| 6,871,063 B1 * | 3/2005 | Schiffer ...................... 455/410 |
| 2002/0164975 A1 * | 11/2002 | Lu .............................. 455/413 |
| 2003/0023882 A1 * | 1/2003 | Udom ......................... 713/202 |

* cited by examiner

Primary Examiner—Gerald Gauthier

(57) ABSTRACT

A wireless security and access device including a housing, a wireless radio receiver embedded in the housing for receiving notification of an arrived message, a processor and memory embedded in the housing for processing and storing the notification, an indicator for displaying the notification of the arrived message and a radio transmitter embedded in the housing for transmitting a preset unique radio signal. The preset unique radio signal from the wireless security and access device is adapted to interface with a receiver of a personal computer, computer networks and peripheral devices, and public or private telecommunication system, preset to receive the unique radio signal.

14 Claims, 4 Drawing Sheets

WIRELESS SECURITY AND ACCESS DEVICE

FIELD OF THE INVENTION

The present invention relates generally to wireless security and access, and more particularly to a wireless security and access device for receiving notification of arrived messages, including telephonic or electronic messages, and providing a means of securely accessing computers, computer networks and peripheral devices, and public or private telecommunication systems, all through wireless technology.

BACKGROUND OF THE INVENTION

Over time, the use of computers, various programs, and public and private telephone systems, has led to a wide array of security and subscriber-oriented enabling methods. In addition, as the prevalence of electronic mail (commonly referred to as "e-mail") systems increases, subscribers feel a growing need to be notified of such mail and to retrieve the mail virtually as soon as it arrives. Again, together with the need to quickly access a personal computer or telecommunication system to retrieve such messages, a secure access interface is necessary to prevent unauthorized users from doing so.

Typically, current access to computers and telephony networks and systems requires a user to perform certain tasks in order to enable and/or gain access to these devices, thereby ensuring the security of the devices.

However, the various methods and devices currently available require the use of fallible and somewhat time consuming interface methods with each of the devices. For example, the most common of the known methods is the memorization and inputting of keyboard/keypad entry passwords. For obvious reasons, this method is both unreliable and time consuming. Another known method is the use of coded magnetic 'swipe-card' systems, with or without entry passwords (such as personal identification or "PIN" numbers) (see, for example, U.S. Pat. No. 6,230,003 issued to James Macor on May 8, 2001, and commonly-assigned). However, this type of access and/or security and identification means is similarly unreliable as the magnetic strips commonly fail and are highly susceptible to wear and damage rendering the magnetic code and the device unusable.

Accordingly, it would be desirable to provide a small, inexpensive device that allows a user to be notified of any incoming messages through wireless means, access the telecommunication network or personal computer in which the message is stored, again through wireless means, and provide the ability to perform various preliminary functions, such as preset PC start-up functions or preset telecommunication functions such as dialing a number and providing billing information, all through wireless control.

SUMMARY OF THE INVENTION

In view of the foregoing, it is an object of the present invention to provide a wireless security and access device, including a housing, a wireless radio receiver for receiving notification of an arrived electronic message, a processor and memory for processing and storing the notification, an indicator for displaying the notification of the arrived message and a radio transmitter for transmitting a preset unique radio signal. The preset unique radio signal from the wireless security and access device is adapted to interface with a radio receiver of a personal computer preset to receive the unique radio signal.

In one embodiment, the radio receiver of a personal computer, in receipt of the unique radio signal from the WSAD device, prompts the computer to perform predetermined actions including turning the personal computer on, or opening predetermined programs.

In another embodiment of the invention, a method for providing secure access to electronic messages residing on a personal computer is described, the method comprising the steps of receiving notification at a remote wireless security and access device (WSAD) that an incoming electronic message has been received at a computer. The user of the WSAD device, within an acceptable distance from the computer radio receiver, may press a button that transmits a preset unique radio signal to the computer. The computer is preset to turn on and retrieve the electronic message upon receipt of the preset unique radio signal.

In a particular embodiment, the notification received in said receiving step is transmitted by a radio transmitter of the personal computer and in yet a further particular embodiment, the notification received is transmitted by a radio transmitter of a service provider.

In another embodiment of the invention a wireless security and access device includes a housing, a wireless receiver for receiving notification of an arrived voicemail message, a processor and memory for processing and storing the notification, an indicator for displaying the notification of the arrived message and a transmitter for transmitting a preset unique radio signal. The preset unique radio signal from the wireless security and access device is adapted to interface with a receiver of a telecommunication system preset to receive the unique radio signal, which may then prompt the system to perform predetermined actions upon receipt of the unique radio signal.

In a further embodiment, the WSAD device is incorporated into a wireless telephone handset. In this embodiment, the WSAD becomes a wireless security and access feature of the handset. All of the functionality of the handset may remain intact, together with the added functionality of the wireless security and access device.

DETAILED DESCRIPTION

Figure 1:
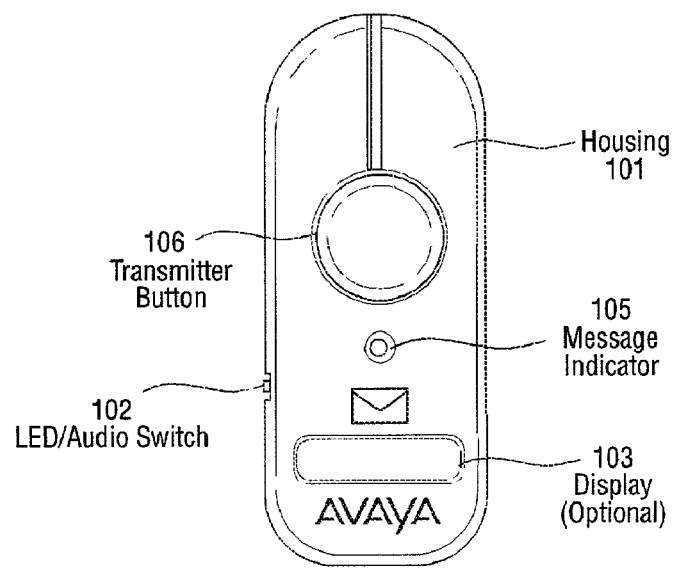
FIG. 1 shows one embodiment of a wireless security and access device constructed in accordance with the present invention.

Referring to FIG. 1, the concept of the present invention is illustrated. Specifically, FIG. 1 shows a exemplary device 10 constructed in accordance with the present invention for notifying a user that a message (e.g. an electronic or "email" message or a phone message) has arrived and allowing the user to use a preset (precoded) unique radio signal from the device to either (1) a private or public telecommunication system or (2) a computer to access the email or any other information therein. The small, hand-held device 10 may be embodied in a housing approximately the size of a keyless automobile entry device which can be conveniently carried on the subscriber's person.

Figure 2:
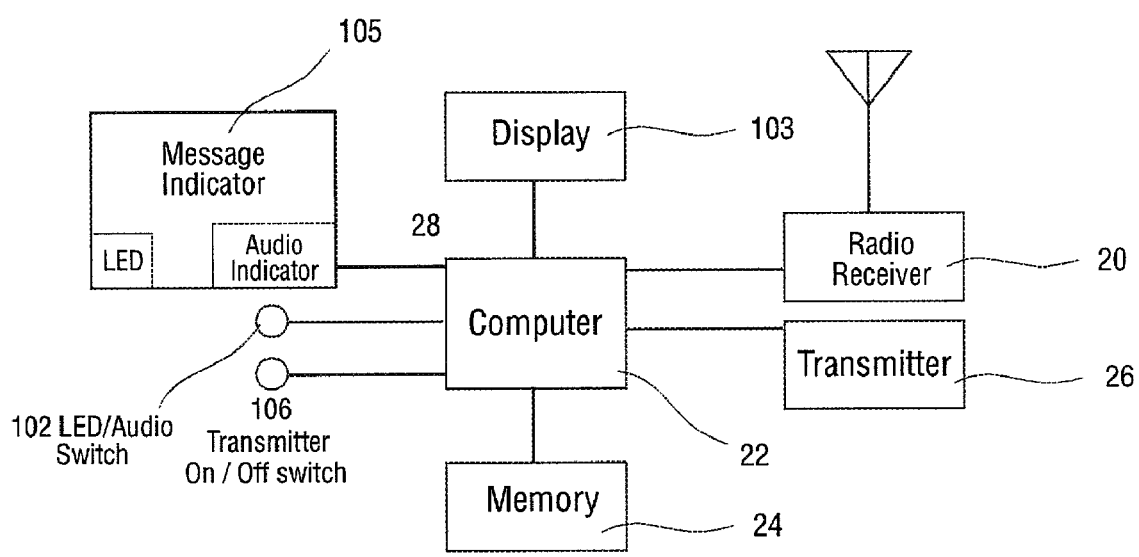
FIG. 2 shows a simplified block diagram of the wireless security and access device shown in FIG. 1.

As shown in the simplified block diagram of FIG. 2, embedded within the housing 101 is a wireless receiver 20, a processor 22, memory 24, transmitter 26, message indicator 105, LED/audio switch 102, electronic display 103 and a wireless transmitter switch 106. The transmitter 26 uses a preset unique radio signal, such as that used for keyless automobile entry systems for example, to interact with a system or network that is preset to receive the unique signal. For example, if a computer is preset to receive the signal, the device 10 could be used to start up the corresponding computer (thereby eliminating the annoying start-up time), to access email, to enter various programs including the internet, etc. The preset unique radio signal could similarly prevent access to various programs by providing access only to predetermined programs (i.e., the signal itself is a "password", in that the computer is programmed to respond only to a certain precoded unique radio signal or signals, and to activate and allow access to only certain programs based on the specific precoded unique radio signal(s) received). In addition, in a similar manner the precoded unique radio signal could provide the user with a quicker and more reliable access means to public telephone systems to enable the system to make telephone callbacks. Likewise, the telecommunication system may be preset to turn on and retrieve the voicemail message upon receipt of the precoded unique radio signal.

Of course, if the user desired to "deactivate" the ability of the wireless security and access device 10 to interface with the computer, he could do so by inputting the appropriate traditionally keyboard entered password information. If, for example, the device were lost, he could do so by manually starting the computer with traditional passwords and keyboard interface and, using the appropriate system software, deactivate the ability of device 10 to interface with that computer.

The display 103 may show the time of receipt of the telephone or email message and email address of the email caller. Message indicator 105, such as an LED or some type of audible audio indicator, alerts the subscriber that a message has arrived by visual and/or audio (e.g., an audible beep) means. Of course indicator 105 may be deactivated or altered between audio and visual indicating states, by any convenient means, such as by providing a small hole containing a recessed switch, LED/audio switch 102 that is accessed by an object such as a pen.

Figure 3:
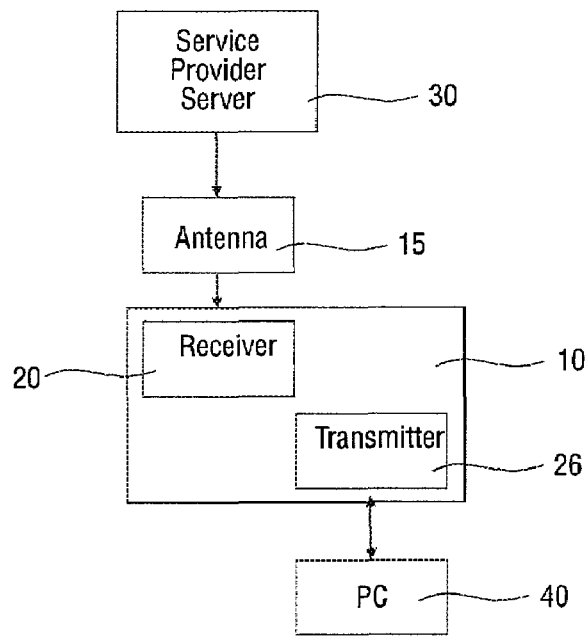
FIG. 3 shows a block diagram of a service provider forwarding notification of an arrived message to the device of FIG. 1 and the device activating and accessing the message at a personal computer through a wireless operation.
Figure 5:
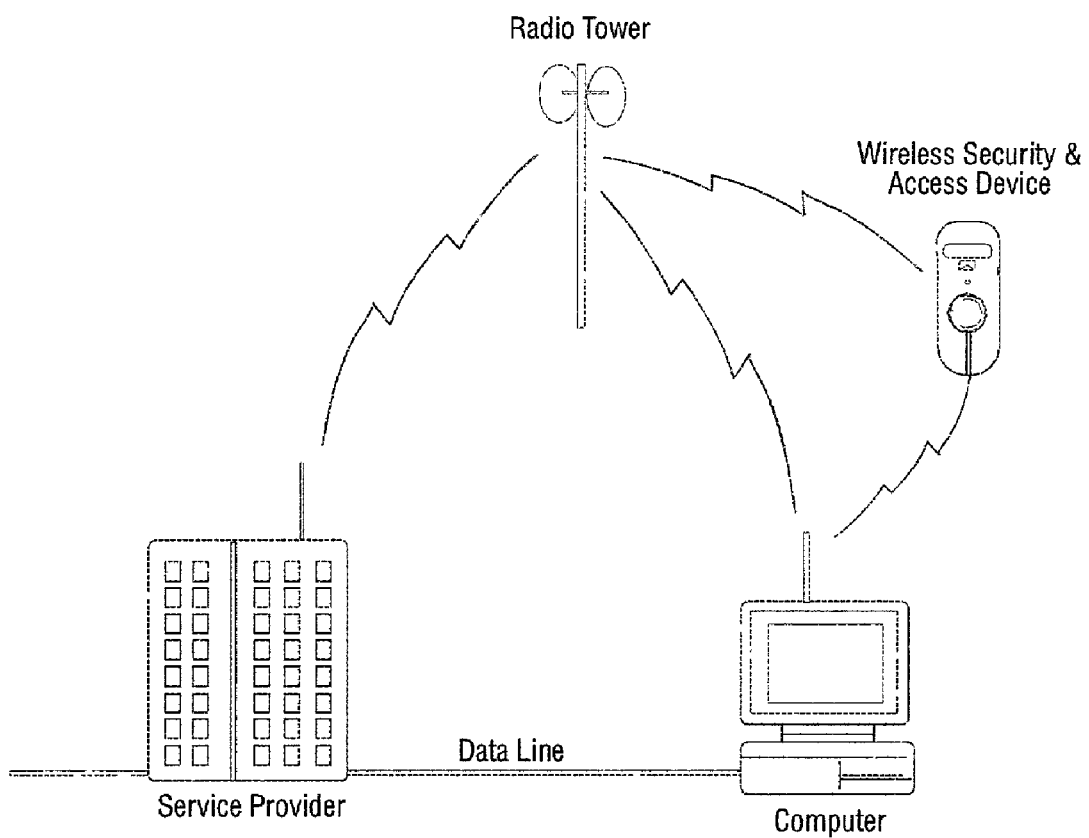
FIG. 5 shows a simplified diagram of various signal flows between a wireless security and access device in accordance with the present invention and a service provider and computer. In this diagram, a WAN cellular network is utilized by means of conventional cellular or PCS technologies.

In operation, referring to FIG. 3, the device 10 functions as a wireless security and access device and as a device for receiving notification that a message (telephonic or electronic) has arrived (on the subscriber's telephone or computer, respectively). In one embodiment, upon receiving for example an incoming electronic message, the service provider transmits a radio-frequency signal to the device 10 via an antenna or satellite system 15 using conventional cellular of PCS spectrum frequencies and protocols. For example, referring to FIG. 5, the service provider illustrated may transmit a signal indicating that a message has been received, through the radio tower shown, to the wireless security and access device 10, while at the same time, transmitting the received message to the computer 22 through conventional means over the data line (those skilled in the art will appreciate that, alternatively, the received message may be transmitted to the computer through wireless transmission as indicated).

Figure 6:
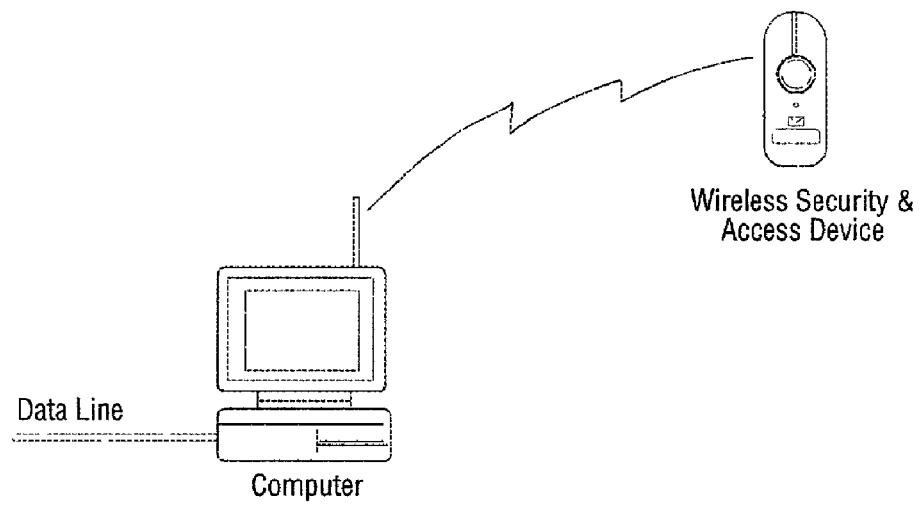
FIG. 6 shows a simplified block diagram of the signal flow between a wireless security and access device shown in accordance with the present invention and a computer, in a "closed" system. In this diagram, a personal network may be utilized by means of 900 MHz Cordless spectrum, Cordless 46–49 MHz or Blue Tooth 2.4 GHz technologies.

In an alternative embodiment, illustrated in FIG. 6, the signal transmitted to the wireless security and access device 10 may be transmitted, using conventional cordless frequency spectrum and conventional transceiver components, by the PC 22, directly after the PC 22 receives an electronic message (in that case the wireless security and access device and the personal computer would be a "closed personal system" thereby eliminating the need for a service provider to transmit the notification to the device that a message has been received). In either embodiment, the signal, which may contain detailed information regarding the arrived message, is received by receiver 20 and processed by processor 22 in a conventional manner so that message indicator 105 is activated and the decoded information may be directed to display 103.

If desired, the user can then activate wireless transmitter switch 106 which prompts transmitter 26 to transmit a preset unique radio signal to access, for example, the received email message at the user's computer 40 (whether that computer be a personal computer or any number of computers within a private or public network that has system features for interfacing with the wireless security and access device defined herein). The computer's sensing unit, upon receipt of the unique signal, can enable the computer, open a programmed destination or software application etc (it will be appreciated by those skilled in the art that the preset unique radio signal may also be received by a public or private telephony network that includes system features for interfacing with the wireless security and access device and which may be activated by the signal and retrieve the received voice message).

Figure 4:
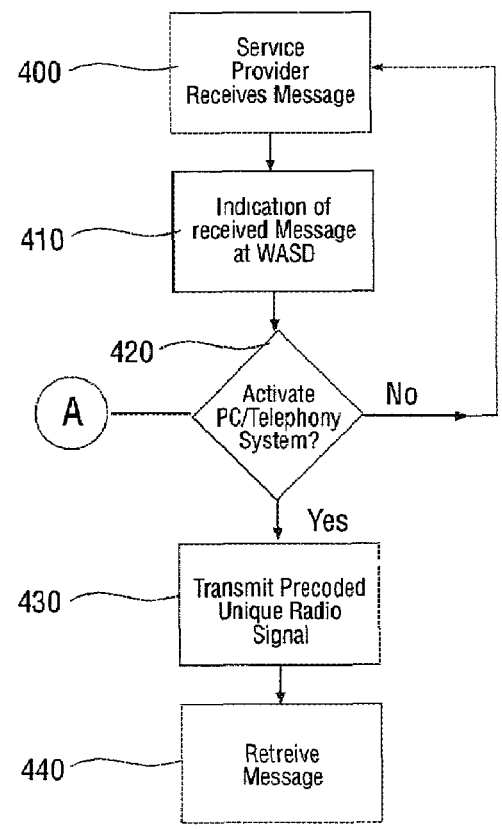
FIG. 4 is a flow chart illustrating the operations performed in the block diagram of FIG. 3.

More specifically, turning to FIG. 4, which provides a flow chart illustrating the operations of a device according to the present invention, as shown in step 400, a service provider receives a message for a subscriber and forwards an indication to the wireless security and access device. In step 410, the indication is received at the device which provides an audible/LED indication to the subscriber (of course, the subscriber may also 'turn off' all such indicators in which case it will simply be stored in memory 24). Continuing to step 420, a determination is made as to whether the subscriber wishes to activate the corresponding telephony system or computer to retrieve the received message. If yes, in step 430 the user activates transmitter on/off switch 106 to activate transmitter 26 to transmit a precoded unique radio signal. If the subscriber does not wish to activate the corresponding system, the process returns to step 400 to await receipt of a further message. Step 440 completes the process to cause the telephony or computer system to activate and retrieve the message as previously set (in addition, the signal may prompt the computer to open any programs, etc).

Of course, in addition to be "prompted" by the receipt of a message, a wireless security and access device, according to one embodiment of the invention, may also activate a computer or telephony system without receipt of any message. FIG. 4 illustrates this option as input "A" into step 420 of the process in which a determination is simply made whether or not to activate the corresponding system.

Figure 7:
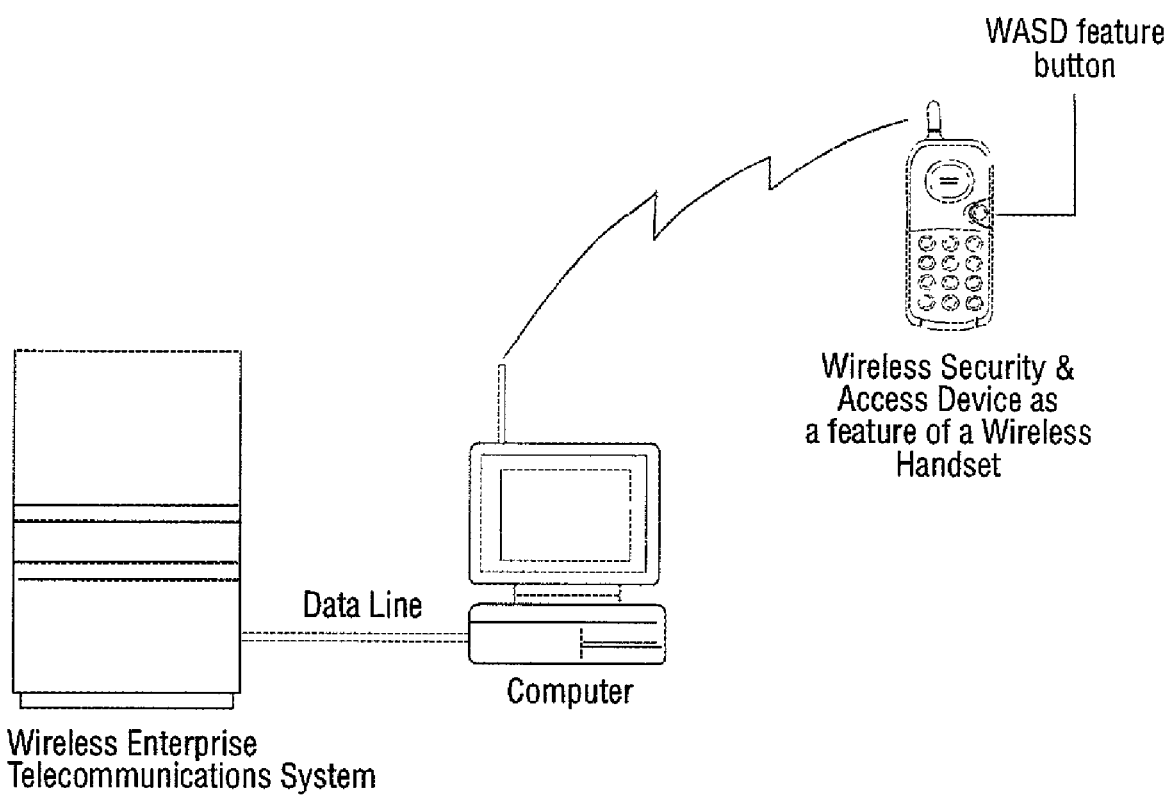
FIG. 7 shows a simplified block diagram for the incorporation of a wireless security and access device as an enhanced feature for the Avaya Definity EC500® telecommunications system. In this diagram, the WSAD feature is incorporated into the cellular phone handset as illustrated by the notification display and security system access button.

In the embodiment illustrated in FIG. 7 a wireless security and access device is incorporated as an enhanced feature in a wireless enterprise communication system, such as is offered by the Avaya Definity EC500® telecommunications system. In this diagram, the WSAD feature is incorporated into the cellular phone handset as illustrated by the notification display and security system access button. As in the embodiment shown in FIG. 6, the signal transmitted to the cellular phone (including WSAD features) of FIG. 7 may be transmitted, using conventional cordless frequency spectrum and conventional transceiver components, by the PC, directly after the PC receives an electronic message from the wireless enterprise communication system.

Although various embodiments are specifically illustrated and described herein, it will be appreciated that modifications and variations of the present invention are covered by the above teachings and are within the purview of the appended claims without departing from the spirit and intended scope of the invention. For example, the device may be used solely to activate and input the required passwords to a personal computer or public telephony system, without receiving any indication of the receipt of a message (email or telephonic).

In addition, a plurality of devices may be used to activate the same personal computer, but may provide various program access based on the level of accessibility previously assigned to the specific device (the radio receiver of the PC can utilize known software technology to interpret multiple radio signals, recognize each WSAD device individually and act appropriately based on the received signal). Essentially the users or system administrator would program the computer's limitations and functionalities permitted based on each individual transmitter of the plurality of devices corresponding to the PC.

Finally, the features of the wireless security and access device described herein, in addition to being a "stand alone device", may be integrated into a pager device that would enable a public telephony system and identify the user for billing purposes. Similarly, the features may be integrated into a wireless telephone handset also providing the ability to enable and access a public telephony system or an individual PC. Again, these modifications of the present invention are covered by the above teachings and are within the purview of the appended claims.

The invention claimed is:

1. A wireless security and access device for interacting with a personal computer, the device comprising:
   a housing;
   a wireless radio receiver embedded in the housing for receiving notification of a first personal computer's receipt of an electronic message;
   a processor and memory embedded in the housing for processing and storing the notification;
   an indicator for displaying the notification; and
   a radio transmitter embedded in the housing for transmitting a preset unique radio signal;
   wherein the preset unique radio signal from the wireless security and access device is sent to a radio receiver of a second personal computer; and upon receiving the preset unique radio signal, the second personal computer opens at least one program;
   wherein the second personal computer is the first personal computer or is linked to the first personal computer;
   wherein the at least one program is a message access program;
   wherein the second personal computer is linked to the first personal computer, and upon receiving the preset unique radio signal from the wireless security and access device, the second personal computer opens the message access program, retrieves the electronic message from the first personal computer, and displays the electronic message at the second personal computer.

2. The device of claim 1, wherein upon receiving the preset unique radio signal, the second personal computer is turned on to run a start-up process of the second personal computer.

3. The device of claim 1, wherein a password is preset to unlock the second personal computer, and upon receiving the preset unique radio signal, the second personal computer is unlocked to open the at least one program without entering the password.

4. The device of claim 1, further comprising a display for displaying time of the first personal computer's receipt of the electronic message and information of the sender of the electronic message.

5. The device of claim 1, wherein the wireless security and access device is incorporated into a wireless telephone handset.

6. A method for providing a secure access by a wireless security and access device to a personal computer, comprising:
   receiving a notification at the wireless security and access device that an incoming electronic message has been received at a first personal computer;
   presetting a second personal computer to open at least one program upon receiving a preset unique radio signal from the wireless security and access device;
   transmitting the preset unique radio signal from the wireless security and access device to the second personal computer; and
   opening the at least one program by the second personal computer upon receiving the preset unique radio signal from the wireless security and access device;
   wherein the second personal computer is the first personal computer or is linked to the first personal computer;
   wherein the at least one program is a message access program;
   wherein the second personal computer is linked to the first personal computer, and the step of opening the at least one program includes upon receiving the preset unique radio signal from the wireless security and access device opening the message access program, retrieving the electronic message from the first personal computer, and displaying the electronic message at the second personal computer.

7. The method of claim 6, wherein the step of opening the at least one program includes running a start-up process of the second personal computer.

8. The method of claim 6, wherein a password is preset to unlock the second personal computer, and the step of opening the at least one program includes upon receiving the preset unique radio signal from the wireless security and access device, the second personal computer is unlocked to open the at least one program without entering the password.

9. A wireless security and access device for interacting with a telecommunication system, the device comprising:
   a housing;
   a wireless radio receiver embedded in the housing for receiving notification of a first telecommunication system's receipt of a voicemail message;
   a processor and memory embedded in the housing for processing and storing the notification;
   an indicator for displaying the notification; and
   a radio transmitter embedded in the housing for transmitting a preset unique radio signal;
   wherein the preset unique radio signal from the wireless security and access device is sent to a radio receiver of a second telecommunication system; and upon receiving the preset unique radio signal, the second telecommunication system opens at least one program;
   wherein the second telecommunication system is the first telecommunication system or is linked to the first telecommunication system via a telecommunication network;
   wherein the at least one program is a voicemail access program;
   wherein the second telecommunication system is linked to the first telecommunication system, and upon receiving the preset unique radio signal from the wireless security and access device, the second telecommunication system opens the voicemail access program, retrieves the voicemail message from the first telecommunication system, and plays the voicemail message at the second telecommunication system.

10. The device of claim 9, wherein a password is preset to unlock the second telecommunication system, and upon receiving the preset unique radio signal, the second telecommunication system is unlocked to open the at least one program without entering the password.

11. The device of claim 9, further comprising a display for displaying time of the first telecommunication system's receipt of the voicemail message and information of the sender of the voicemail message.

12. The device of claim 9, wherein the wireless security and access device is incorporated into a wireless telephone handset.

13. A method for providing a secure access by a wireless security and access device to a telecommunication system, comprising:
   receiving a notification at the wireless security and access device that an incoming voicemail message has been received at a first telecommunication system;
   presetting a second telecommunication system to open at least one program upon receiving a preset unique radio signal from the wireless security and access device;
   transmitting the preset unique radio signal by the wireless security and access device to the second telecommunication system; and
   opening the at least one program at the second telecommunication system upon receiving the preset unique radio signal from the wireless security and access device;
   wherein the second telecommunication system is the first telecommunication system or is linked to the first telecommunication system via a telecommunication network;
   wherein the at least one program is a voicemail access program;
   wherein the second telecommunication system is linked to the first telecommunication system, and the step of opening the at least one program includes upon receiving the preset unique radio signal from the wireless security and access device opening the voicemail access program, retrieving the voicemail message from the first telecommunication system, and playing the voicemail message by the second telecommunication system.

14. The method of claim 13, wherein a password is preset to unlock the second telecommunication system, and the step of opening the at least one program includes upon receiving the preset unique radio signal from wireless access and security device, the second telecommunication system to open the at least one program without entering the password.

* * * * *